(12) United States Patent
Hovanky

(10) Patent No.: US 6,356,308 B1
(45) Date of Patent: Mar. 12, 2002

(54) DEVICE FOR ROTATABLY POSITIONING A CAMERA OR SIMILAR ARTICLE ABOUT TWO ORTHOGONAL AXES

(75) Inventor: Thao D. Hovanky, Austin, TX (US)

(73) Assignee: Polycom, Inc., Milpitas, CA (US)

( * ) Notice: Subject to any disclaimer, the term of this patent is extended or adjusted under 35 U.S.C. 154(b) by 0 days.

(21) Appl. No.: 09/215,059

(22) Filed: Dec. 17, 1998

Related U.S. Application Data

(60) Provisional application No. 60/089,009, filed on Jun. 11, 1998.

(51) Int. Cl.[7] ............................................. H04N 5/225
(52) U.S. Cl. ..................... 348/373; 348/143; 348/211
(58) Field of Search ................................. 318/632, 640, 318/560, 561, 115; 348/207, 373, 374, 375, 376, 211, 212, 36, 39, 143; 310/12, 14, 15

(56) References Cited

U.S. PATENT DOCUMENTS

| | | | |
|---|---|---|---|
| 5,267,144 A | * 11/1993 | Yoshoda et al. ............ 318/516 |
| 5,473,368 A | 12/1995 | Hart ............................ 348/155 |
| 5,475,209 A | 12/1995 | Nabeshima ............... 250/201.4 |
| 5,748,995 A | * 5/1998 | Kitagawa et al. ............. 396/55 |
| 5,814,962 A | 9/1998 | Mizumoto ................... 310/600 |
| 5,828,503 A | * 10/1998 | Kaneda et al. ................ 396/85 |
| 6,036,637 A | * 4/2000 | Kudo .......................... 600/173 |

* cited by examiner

Primary Examiner—Tuan Ho
(74) Attorney, Agent, or Firm—Carr & Ferrell LLP

(57) ABSTRACT

A positioning device is provided for rotatably positioning a camera or other article about orthogonal rotational axes. The positioning device includes a carriage supported for rotation about a horizontal axis by a yoke. The yoke is in turn rotatably coupled to a base assembly for rotation of the yoke about a vertical axis. Rotation of the camera about the horizontal and vertical axes is respectively effected by first and second voice coil actuators, each comprising a pair of magnets and at least one coil to which current is supplied. The amplitude and direction of the current supplied to the coil determines the speed and direction of rotation of the camera. The second voice coil actuator preferably includes a coil assembly comprising two opposed coils. This design overcomes the angular range limitations associated with prior art voice coil actuators and enables rotation of the camera about an extended angular range. The device can be advantageously utilized for adjustment of the pan and tilt angles of a video camera in a conferencing system.

7 Claims, 8 Drawing Sheets

DEVICE FOR ROTATABLY POSITIONING A CAMERA OR SIMILAR ARTICLE ABOUT TWO ORTHOGONAL AXES

CROSS-REFERENCE TO RELATED APPLICATION

This application claims the benefit of U.S. Provisional Application No. 60/089,009, filed on Jun. 11, 1998 and entitled "Two-Axis Positioning Device".

BACKGROUND

1. Field of the Invention

The present invention relates generally to positioning devices, and more particularly to a device for rotatably positioning a camera about two orthogonal rotational axes.

2. Description of the Prior Art

Videoconferencing systems utilize video cameras to capture an image of the conference participants for transmission to a remote conferencing site. The video camera may be beneficially provided with a device for adjusting the rotational orientation of the camera such that the image of a speaking conference participant is properly framed. The rotational orientation of the camera may be adjusted manually by user manipulation of controls (located either on a videoconferencing system console or on a remote control device associated therewith) which cause the camera to rotate in the desired direction or directions. Alternatively and preferably, adjustment of the camera's rotational orientation is achieved by an automatic technique such as acoustic localization, wherein the position of the speaking participant is calculated by analysis of plural acoustic signals, and the camera is steered in the direction of the calculated position.

Irrespective of whether the camera rotational positioning device is controlled by manual or automatic techniques, such devices require one or more actuators to rotate the camera such that the desired rotational orientation is achieved. Positioning devices designed to rotate the camera about two orthogonal axes (in order to enable more accurate framing of the image of speaking conference participants) typically utilize two actuators: the first actuator rotates the camera about a vertical axis, while the second actuator rotates the camera about a horizontal axis perpendicular to the camera's longitudinal axis. Rotation of the camera about the vertical axis is referred to herein as "panning"; rotation about the horizontal axis is referred to herein as "tilting"; and, devices for rotating the camera about a vertical and horizontal axis are referred to herein as "pan/tilt positioning devices."

Most presently-employed pan/tilt positioning devices utilize stepper motors to effect rotation of the camera. Stepper motors have the advantage of being relatively inexpensive, easy to control, and widely commercially available in a range of sizes and operational specifications. However, the use of stepper motors to rotate a camera in a videoconferencing system has a number of problems associated therewith. Typically, a gear train or similar set of transmission elements must be employed to transmit power from the stepper motor shaft to the camera. Movement of the gears during operation of the positioning device can generate a substantial amount of noise. This noise can be annoying and distracting to the conference participants. More importantly, the noise can interfere with acoustic localization techniques utilized to automatically orient the camera in the direction of the speaking participant.

Further, gears or other transmission elements may be susceptible to misalignment or breakage due to wear or rough handling, thereby rendering the positioning device partially or fully inoperative. Still further, the inclusion of the gear train into the positioning device makes its assembly more complex and consequently raises manufacturing costs. Finally, positioning devices utilizing stepper motors typically operate slowly and/or have limited angular resolution.

In view of the foregoing discussion, there is a need for a rotational positioning device which operates substantially noiselessly, does not require a gear train or similar to transmit power from the actuators to the camera.

SUMMARY

The present invention comprises a rotational positioning device for a camera or similar article which utilizes voice coil actuators to drive rotation of the camera about first and second orthogonal rotational axes. The positioning device includes a carriage to which the camera is fixedly attached. The carriage is supported by a yoke such that it can pivot relative to the yoke about a horizontal axis orthogonal to the longitudinal axis of the camera (thereby allowing adjustment of the camera's tilt angle). The yoke is in turn coupled to a base for pivotal movement relative to the base about a vertical axis (thereby allowing adjustment of the pan angle).

The positioning device advantageously employs first and second rotational actuators of the voice-coil type to respectively effect tilting and panning movements of the camera. As is known in the art, the voice coil actuators each include a set of permanent magnets and at least one coil wound on a non-ferrous base. Supplying current to the coil alters a magnetic field generated in a gap disposed between the magnets and the coil, thereby creating a force vector and causing the magnets to move relative to the coil (or the coil to move relative to the magnets, depending on whether the coil or the magnets are free to move). In a preferred embodiment of the invention, the first voice coil actuator is configured to tilt the camera, and comprises a vertically oriented coil, mounted to the yoke, interposed between a pair of return plates depending from the carriage. One of the return plates is provided with a pair of arcuate permanent magnets. When current is supplied to the coil, the carriage and supported camera are caused to rotate (tilt) relative to the yoke. The direction and speed of rotation is controlled by varying the direction and amount of current supplied to the coil.

In order to overcome rotational travel limitations associated with conventional rotational voice coil actuators, the second rotational actuator is preferably adapted with a dual-coil design. This design advantageously enables panning of the camera about an extended angular range (up to a full 360°). The second voice coil actuator preferably comprises a planar coil assembly supporting two opposed coils. The coil assembly is centrally mounted to a depending shaft of the yoke for co-rotation therewith, and is disposed in a gap between a base plate and a return plate of the base assembly. A pair of adjacently positioned arcuate permanent magnets are fastened to an underside of the return plate. Panning of the camera is effected by supplying current to the coils of the coil assembly, which causes the coil assembly and yoke to rotate relative to the base assembly. By appropriate commutation of the current supplied to the two coils, the camera may be panned over an extended angular range.

The positioning device may be further provided with a control system for precise control of the pan and tilt angle of the camera. The control system comprises a processor, a set of current supplies each configured to supply current to one coil of the first or second voice coil actuator, and angular position sensors for continuously detecting the pan and tilt angle of the camera. The processor is configured to calculate the desired pan and tilt angles of the camera based on acoustic localization data or the like and to determine the difference between the present pan and tilt angles (as measured by the angular position sensors). The, processor then directs each of the current supplies to supply current to the actuator coils so as to cause the positioning device to move the camera to the desired orientation.

DESCRIPTION OF A PREFERRED EMBODIMENT OF THE INVENTION

The present invention provides a positioning device for positioning a video camera or similar article about two orthogonal rotational axes. The following description is intended to enable one skilled in the art to make and use the invention, and is provided in the context of a patent application and its requirements.

Figure 1:
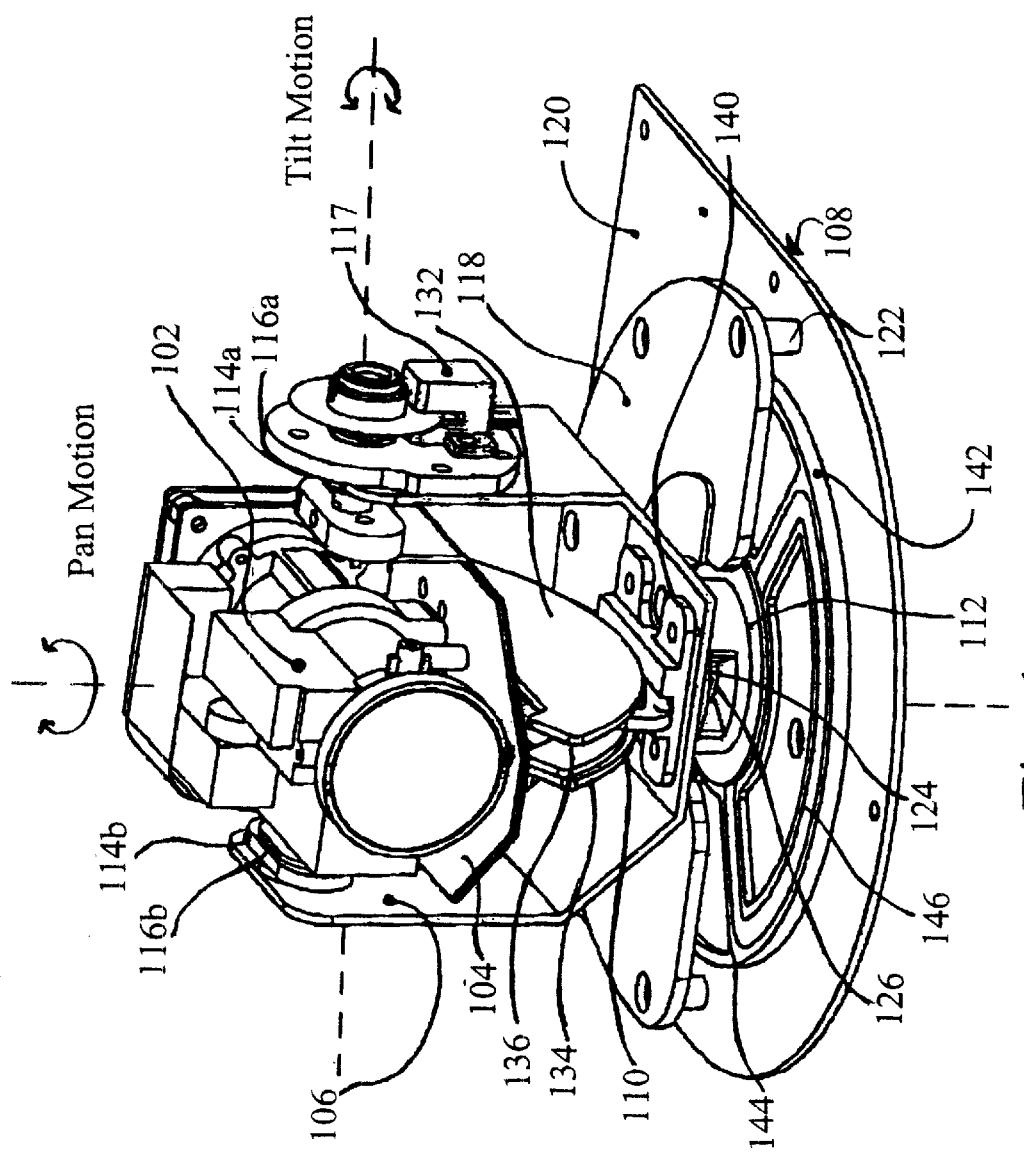
FIG. 1 is a front isometric view of a positioning device according to the present invention.
Figure 2:
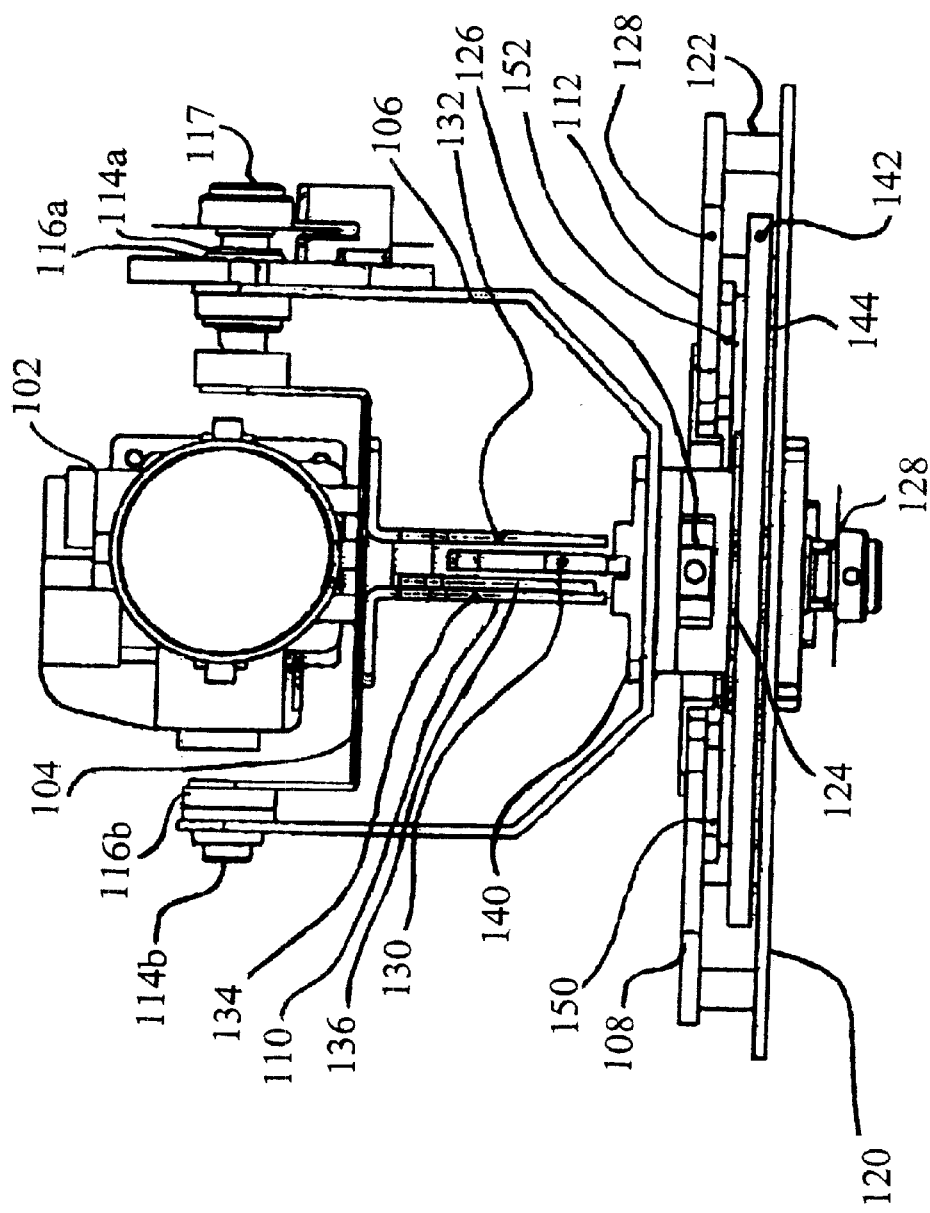
FIG. 2 is a front elevated view of the positioning device.
Figure 3:
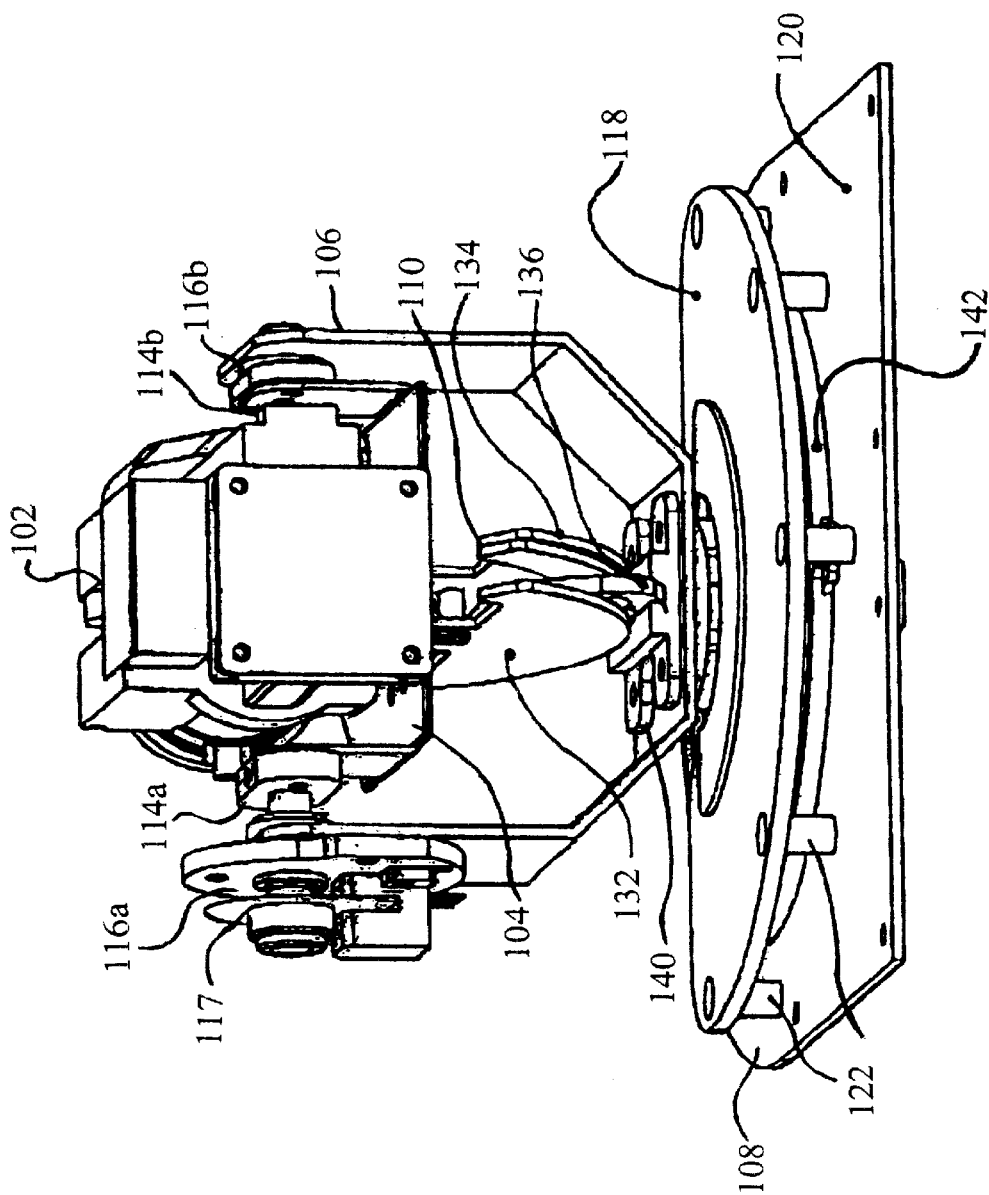
FIG. 3 is a rear isometric view of the positioning device.

FIGS. 1–3 are, respectively, front perspective, front elevated, and rear perspective views of a positioning device 100 according to a preferred embodiment of the present invention. A video camera 102 or similar article: is mechanically coupled to positioning device 100 to enable positioning of camera 102 about vertical (pan) and horizontal (tilt) rotational axes. Camera 102 is fixedly mounted to a carriage 104 for movement therewith. Carriage 104 is rotatably mounted to a yoke 106 to permit rotation of carriage 104 and camera 102 relative to yoke 106 about a horizontal axis generally perpendicular to an optical axis of camera 102 (thereby permitting tilting of camera 102). Yoke 106 is in turn rotatably mounted to a base assembly 108 for rotation relative to base assembly 108 about a vertical axis. The carriage 104 and camera 102 co-rotate with yoke 106 about the vertical axis to produce panning of camera 102. As is discussed in detail hereinbelow, tilting and panning of camera 102 are respectively effected by operation of first and second voice coil actuators 110 and 112, each comprising a pair of permanent magnets and at least one coil to which current is selectively applied to generate a torque vector.

Figure 8:
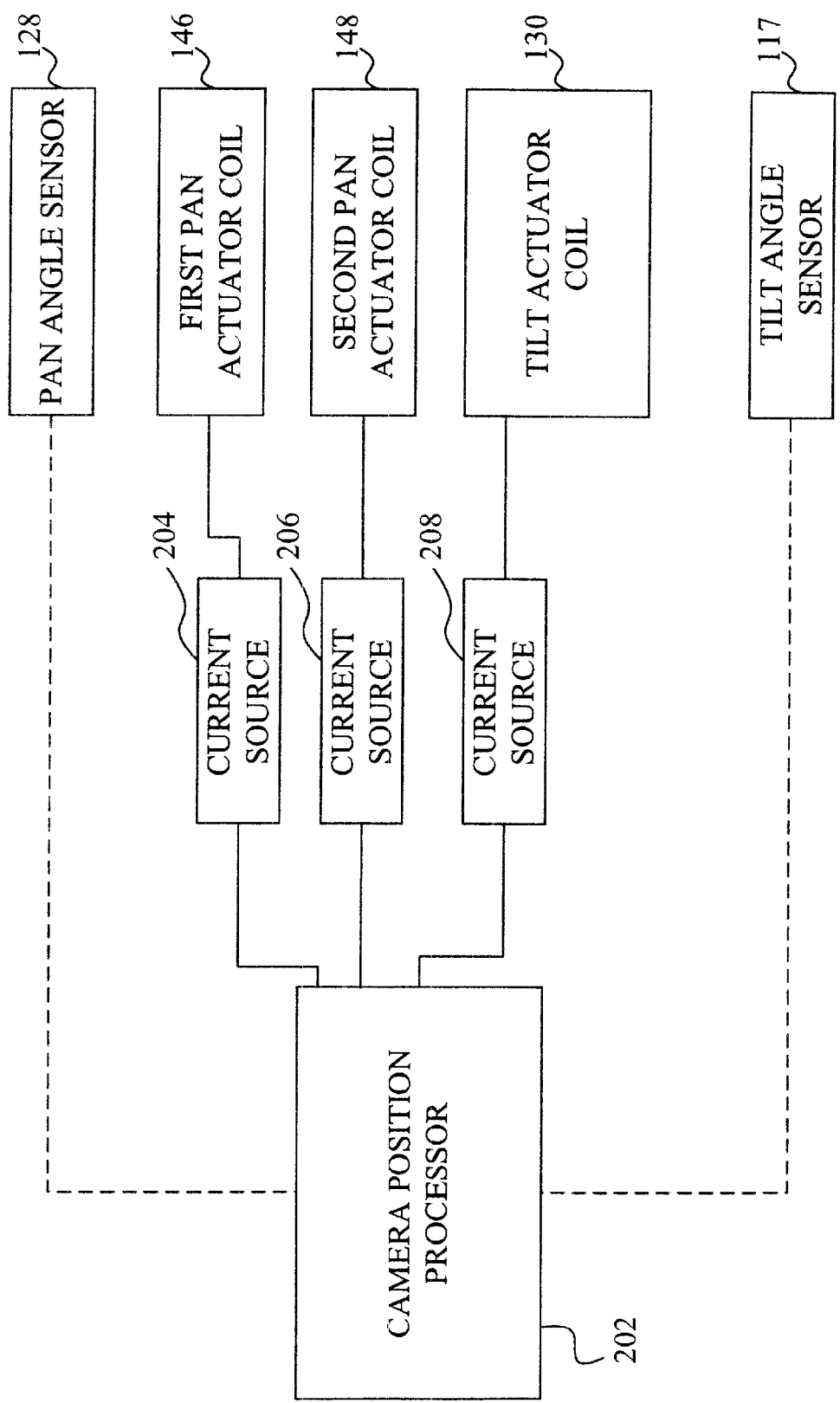
FIG. 8 is a schematic depiction of an exemplary control system for the camera positioning device.

Carriage 104 is provided with opposed shafts 114a and 114b or similar elements which define the tilt axis. Shafts 114a and 114b are respectively supported in bearings 116a and 116b disposed in yoke 106 to permit tilting movement of camera 102 relative to yoke 106. One or more counterweights (not shown) may be secured to carriage 104 to balance carriage 104 and camera 102 within yoke 106 and thereby reduce actuator 110 torque load. As is discussed in further detail below in connection with FIG. 8, positioning device 100 may be provided with an angular position sensor 117 associated with shaft 114a for continuously measuring a tilt angle of camera 102.

Base assembly 108 comprises generally planar return plate 118 and base plate 120 held in parallel spaced apart relation by spacers 122. Return plate 118 and base plate 120 are preferably fabricated from low-carbon cold-rolled steel or a suitable equivalent. Base assembly 108 is provided with bearing 124 which supports a central shaft 126 depending from yoke 106 such that yoke 106 may rotate about a vertical axis relative to base assembly 108 to effect panning movement of camera 102. A second angular position sensor 128, mechanically associated with shaft 126, functions to continuously measure a pan angle of camera 102.

Tilting and panning movement of camera 102 are respectively driven by first and second voice coil actuators 110 and 112. The operational principles of voice coil motors are well known in the art and need not be discussed in detail herein. Generally, a voice coil actuator comprises at least one coil positioned in spaced apart relation to at least one permanent magnet. By selectively supplying current to the coil and thereby generating an associated magnetic field, the permanent magnet is caused to move relative to the coil (or the coil is caused to move relative to the permanent magnet). Voice coil actuators may be configured to produce linear or rotational movement (as in the present invention). The speed and direction of movement are controlled by varying the amount and direction of current supplied to the coil.

Figure 4:
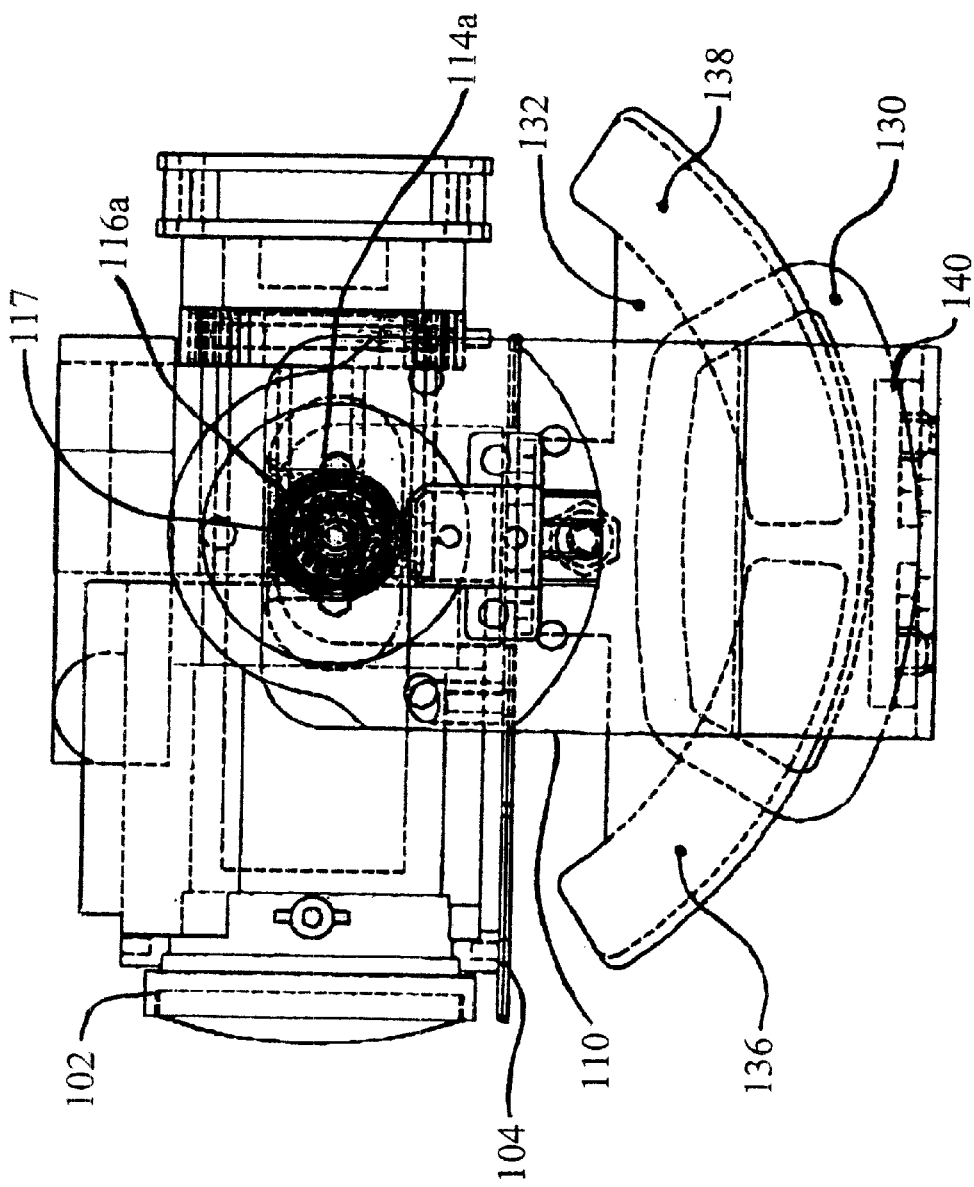
FIG. 4 is an elevated side view depicting components of a tilting actuator of the positioning device.

Referring in particular to FIGS. 2 and 4, first (tilt) voice coil actuator 110 is seen to comprise coil 130 (depicted in phantom in FIG. 4) interposed between first and second return plates 132 and 134, which depend from carriage 104. First and second return plates 132 and 134 are attached to or formed integrally with carriage 104, and are fabricated from steel or suitable equivalent to provide a magnetic return path for first voice coil actuator 110. Arcuate permanent magnets 136 and 138 are fastened to return plate 132 and are adjacently positioned along the circumference of a circle having its center located at the horizontal axis of rotation of positioning device 100. Magnets 136 and 138 preferably comprise high energy product rare earth magnets (such as neodymium-iron-boron magnets), and are configured such that corresponding faces of magnets 136 and 138 possess the same magnetic polarities, i.e., both of the outwardly directed faces comprise the north (or south) poles, and both of the, inwardly directed faces comprise south (or north) poles.

Coil 130, typically comprising copper windings supported on a non-ferrous base, is mounted in bracket 140 secured to a lower horizontal portion of yoke 106 and extends vertically upward into a gap defined between first and second return plates 132 and 134. The leads (not shown) of coil 130 are connected to a current source.

To effect a tilting movement of camera 102, current is supplied to coil 130 to thereby generate a magnetic field in the gap between coil 130 and magnets 136 and 138. The magnetic field thus generated applies a force to magnets 136 and 138, causing carriage 104 and camera 102 to rotate relative to yoke 106 about the horizontal or tilt axis. The speed and direction of rotation (i.e., whether camera 102 is tilted upwardly or downwardly) is achieved by adjusting the direction and magnitude of the current supplied to coil 130.

Panning of camera 102 (rotation about the vertical axis) is achieved by operation of second voice coil actuator 112.

Those skilled in the art will recognize that conventional single-coil voice coil actuators have limited angular travel (typically around 20 degrees). To overcome this limitation, the present invention utilizes a multi-coil design which advantageously enables panning of camera 102 about an extended angular range (up to a full 360°).

Figure 5:
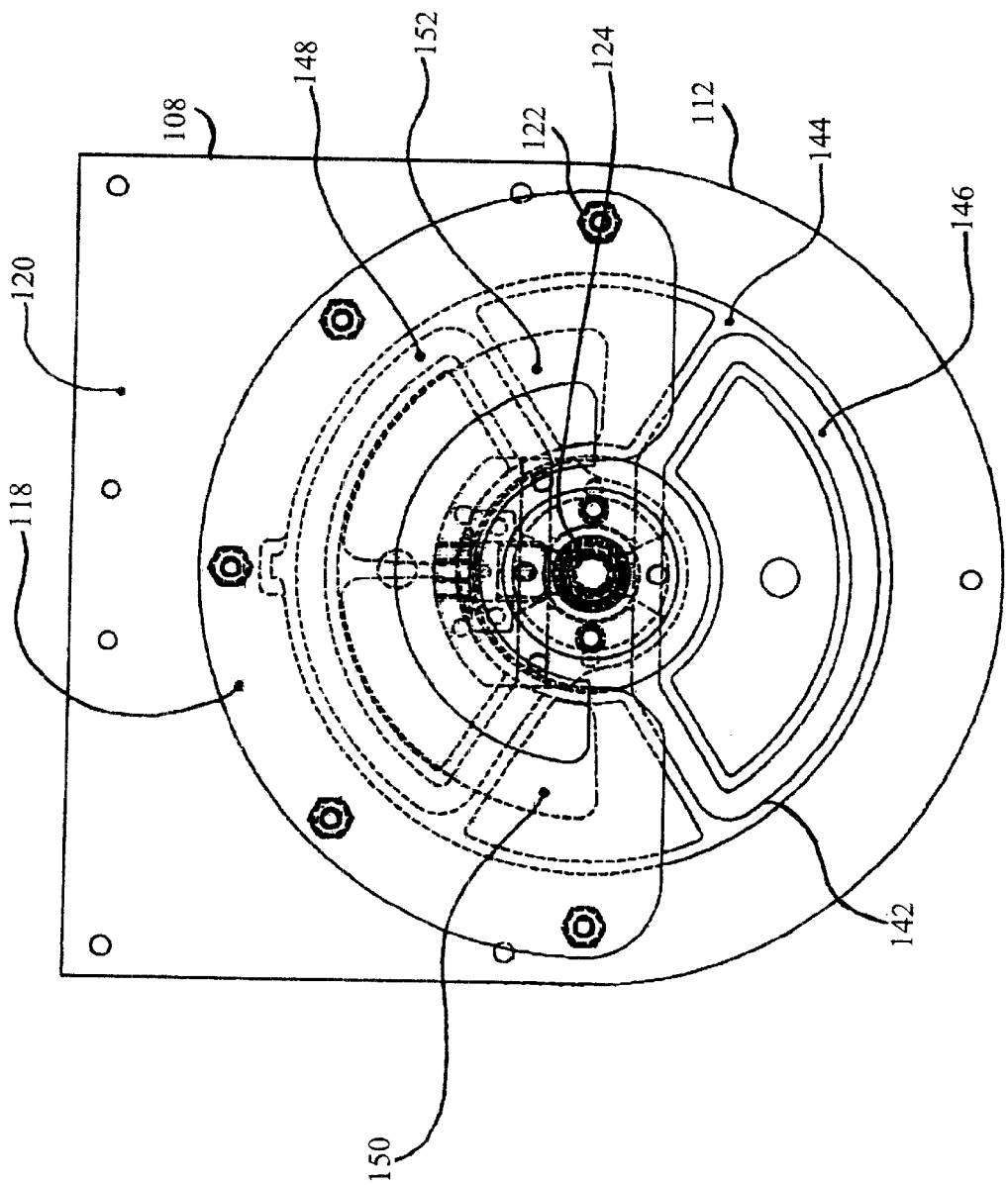
FIG. 5 is a top plan view depicting components of a panning actuator of the positioning device.
Figure 6:
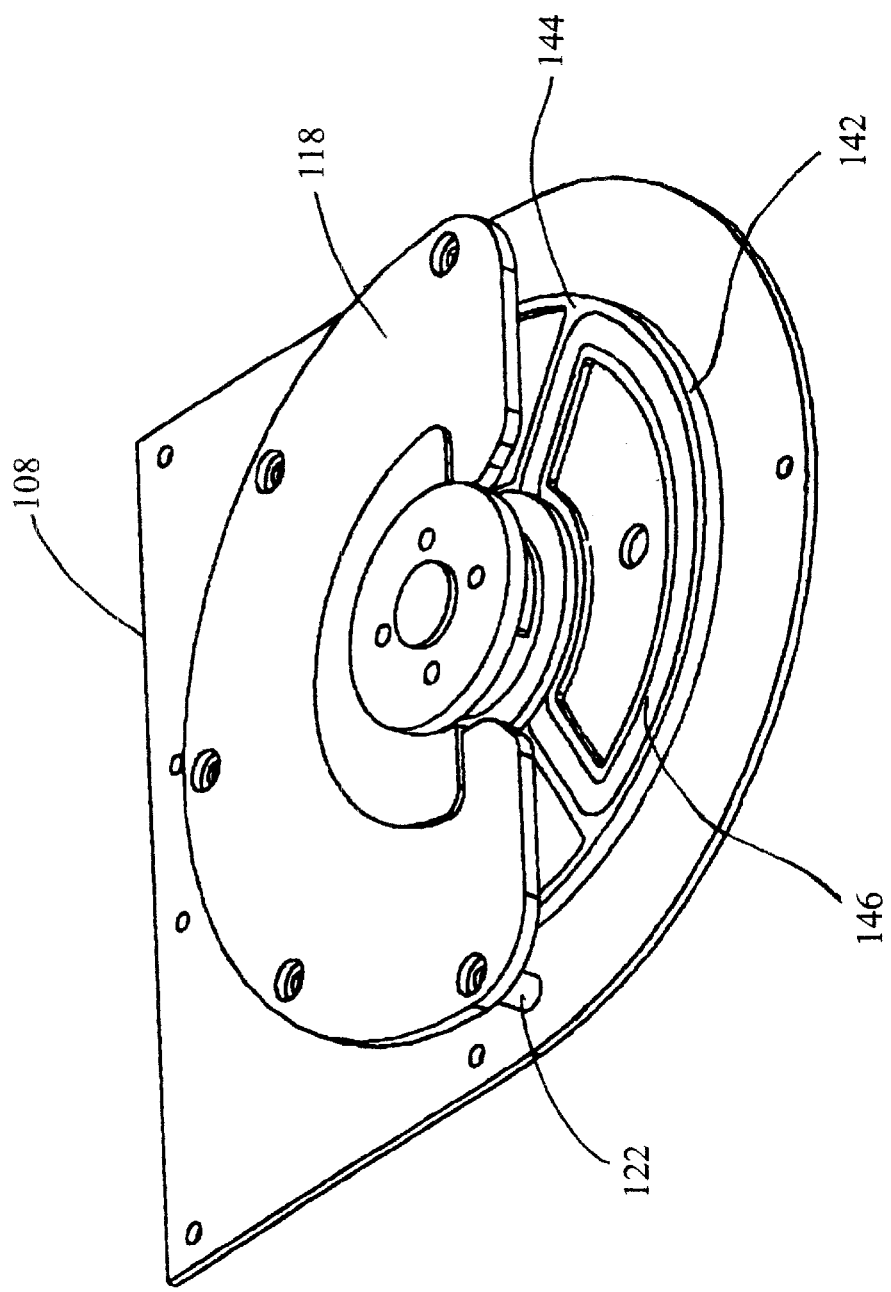
FIG. 6 is an isometric view of the components of the panning actuator.
Figure 7:
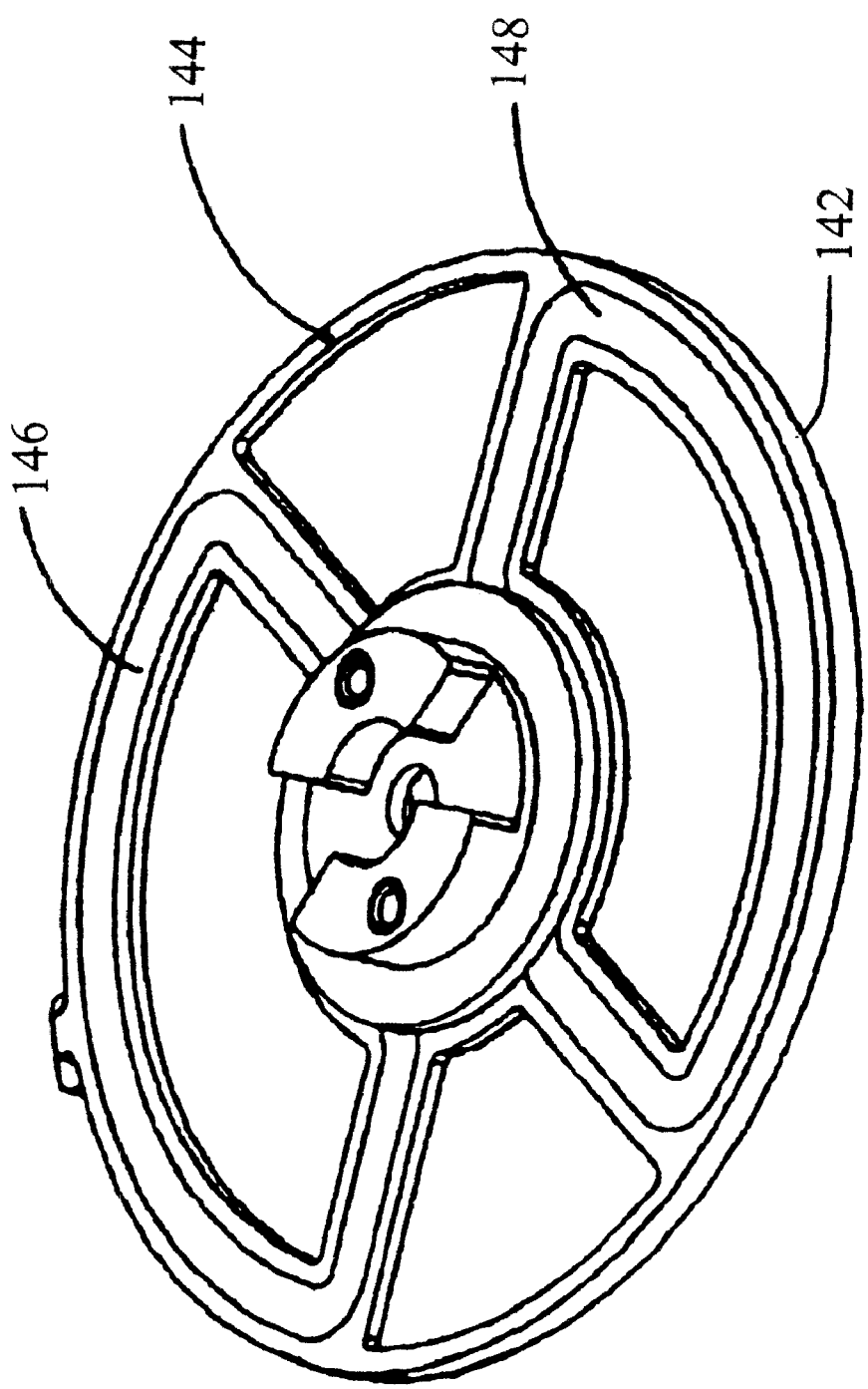
FIG. 7 is an isometric view of a coil assembly of the panning actuator.

Referring to FIGS. 2 and 5–6, second voice coil actuator 112 includes a coil assembly 142 fixedly attached to depending yoke shaft 126 for co-rotation therewith. The generally planar voice coil assembly 142 is disposed in a gap defined interiorly of base plate 120 and return plate 118. As may best be seen with reference to FIG. 7, coil assembly 142 is generally circular in shape, and comprises a coil housing 144 which supports in opposed laterally spaced relation first and second coils 146 and 148. Base plate 120, in addition to having a structural function, also acts as a magnetic flux return path for second voice coil actuator 112. Coil housing 144 is preferably fabricated from molded plastic or other non-conductive material. First and second coils 146 and 148 each typically comprise copper windings on a non-ferrous base, and each coil is provided with a pair of leads (not shown) for connection to a current source.

Returning to FIGS. 5–7, arcuate permanent magnets 150 and 152 are fastened to the underside of return plate 118 and are positioned in adjacent relation along a circumference of a circle having its center located at the vertical axis of rotation of yoke 106 and camera 102. Magnets 150 and 152 preferably comprise high energy product rare earth magnets (such as neodymium-iron-boron magnets), and are configured (in a manner similar to magnets 136 and 138 of first or tilt voice coil actuator 110) such that corresponding faces of magnets 150 possess the same magnetic polarities, i.e., both of the upwardly directed faces comprise the north (or south) poles, and both of the downwardly directed faces comprise south (or north) poles.

When current is supplied to one or both of coils 146 and 148, the resulting magnetic field causes a rotational force to be applied to coil assembly 142, in turn producing rotation of yoke 106 and camera 102 about the vertical or panning axis. Again, the speed and direction of rotation of camera 102 is determined by the amount and direction of current supplied to coils 146 and 148. By appropriately commutating current supplied to coils 146 and 148, second or panning voice coil actuator 112 may be operated over an extended angular range, thus enabling camera 102 to be oriented toward any participant located within the room in which the conference is being held.

It is to be appreciated that panning actuator 112 is configured such that coil assembly 142 rotates while return plate 118 and magnets 150 and 152 are static. Because magnets 150 and 152 are considerably more massive than coil assembly 142, this "static magnet" arrangement serves to reduce the inertia of the moving portions of panning actuator 112, thereby reducing torque requirements and permitting more rapid panning of camera 102.

FIG. 6 depicts in block form an exemplary control system 200 for controlling the operation of positioning device 100. As is discussed hereinabove, positioning device 100 may be advantageously utilized to properly frame the image of a speaking participant in a group videoconference setting. In practice, camera 102 will be maintained at a constant pan and tilt angle while a first participant is speaking from a fixed location (note that the tilt angle may be defined as the angular displacement of the camera from a perfectly horizontal orientation, and pan angle may be defined as the angular displacement of the camera about the vertical axis from a "straight-ahead" orientation). When a second participant begins to speak (or when the first participant moves from the fixed location), control system 200 causes positioning device 100 to rotate camera 102 about the horizontal and vertical (tilt and pan) axes until camera 102 is oriented to new pan and tilt angles appropriate for framing the image of the second speaking participant (or the moving first speaking participant).

As depicted in FIG. 6, control system 200 comprises a camera position processor 202; current sources 204, 206 and 208, each for supplying a desired amount of current to a corresponding coil 130, 146 or 148; first angular position sensor 117 for continuously measuring a present tilt angle of camera 102; and, second angular position sensor 128 for continuously measuring the present pan angle of 102 camera. Camera position processor 202 is configured to calculate target pan and tilt angles which will properly frame the image of the speaking participant. Camera position processor 202 may utilize any suitable technique to locate the speaker and determine the target pan and tilt angles for aiming the camera, such as triangularization based on analysis of acoustic signals received by plural spaced-apart microphones. Once the target pan and tilt angles are determined, camera position processor 202 directs current sources 204, 206 and 208 to supply current to the corresponding coils such that camera 200 is moved in the direction of the target pan and tilt angles.

The camera's present pan and tilt angles are continuously detected by first and second angular position sensors 117 and 128. Sensors 117 and 128 may comprise conventional optical angular encoders or may alternatively comprise the cross-polarization polarization detectors described in co-assigned U.S. patent application Ser. No. 09/179,104, filed on Oct. 26, 1998 and entitled "System and Method for Measuring the Angular Position of a Rotatably Positionable Object". Sensors 117 and 128 sense the angular positions of associated shafts 114a and 126, and responsively generate signals for transmission to camera position processor 202, which in turn calculates the difference between the present and target pan and tilt angles and causes the current supplied to coils 130, 146 and 148 to be adjusted accordingly. Once the desired pan and tilt angles are attained, the current supplied to each coil 130, 146 and 148 is adjusted so that camera 102 remains static (noting that a small amount of current may need to be supplied to one or more coils to prevent camera 102 from being displaced from the target pan and tilt angles due to the influence of gravity). As described above, the target pan and tilt angles are periodically recalculated to allow camera 102 to be oriented to a newly speaking participant or to track a moving speaker.

Those skilled in the art will recognize that various features disclosed in connection with the preferred embodiment may be used either individually or jointly. For example, a positioning device may be provided with two dual-coil actuators to enable orientation of the supported article about two extended angular ranges. Further, the present invention is intended to include positioning devices which rotatably position an article about a single axis, but which utilize the two-coil actuator described hereinabove to overcome the angular stroke limitations associated with prior art voice coil actuators.

It is to be further appreciated that while the positioning apparatus of the present invention has been described with reference to a preferred implementation thereof, i.e., a video camera positioning device, the invention is not limited thereto. Those having ordinary skill in the art will recognize that the present invention may be beneficially utilized in any number of environments and implementations. Accordingly, the claims set forth below should be construed in view of the full breadth and spirit of the invention as disclosed herein.

What is claimed is:

1. A rotational positioning device for a camera comprising:
   a yoke for rotatably supporting the camera, the camera being rotatable relative to the yoke about a first rotational axis;
   a first voice coil actuator for causing the article to rotate about the first rotational axis;
   a base assembly, mechanically coupled to the yoke, the yoke being rotatable relative to the base about a second rotational axis orthogonal to the first rotational axis; and
   a second voice coil actuator for causing the yoke and the supported article to rotate about the second rotational axis, the second voice coil actuator comprising a generally planar coil assembly comprising at least two coils to which current may be independently supplied and being fixedly coupled to the yoke for co-rotation therewith, and a set of concentrically arranged permanent magnets fixedly attached to the base assembly;
   whereby the camera may be positioned about the first and second rotational axes by adjusting current supplied to the first and second voice coil actuators.

2. The positioning device of claim 1, wherein the camera is a video camera, the first rotational axis is a substantially horizontal axis perpendicular to an optical axis of the video camera, and the second rotational axis is a substantially vertical axis.

3. The positioning device of claim 1, further comprising a control system for controlling positioning of the camera about the first and second rotational axes.

4. The positioning device of claim 3, wherein the control system further comprises:
   a set of sensors for continuously generating signals representative of the angular position of the camera;
   at least one processor, coupled to the set of sensors, for receiving the signals and responsively adjusting the current supplied to the first and second voice coil actuators such that the camera is caused to rotate in the direction of a desired angular position.

5. A rotational positioning device for a camera comprising:
   means for supporting the camera, the camera being rotatable relative to the supporting means about a first rotational axis;
   a first voice coil actuator for causing the camera to rotate about the first rotational axis;
   a base, mechanically coupled to the supporting means such that the supporting means and the camera are rotatable relative to the base about a second rotational axis orthogonal to the first rotational axis; and
   a second voice coil actuator for causing the camera and supporting means to rotate relative to the base, the second voice coil actuator including a voice coil assembly fixedly coupled to one of the supporting means or the base for co-rotation therewith, and a set of permanent magnets fixedly coupled to the other of the supporting means or the base;
   whereby the camera may be positioned about the first and second rotational axes by adjusting current supplied to the first and second voice coil actuators.

6. The device of claim 5, further including means for controlling an angular position of the camera.

7. The device of claim 6, wherein the means for controlling further comprises:
   angular position sensing means for detecting the angular position of the camera and responsively generating angular position signals;
   processing means, electronically coupled to the angular position sensing means for receiving the angular position signals and responsively adjusting current supplied to the first and second voice coil actuators to move the camera in the direction of a predetermined angular position setpoint.

* * * * *

UNITED STATES PATENT AND TRADEMARK OFFICE
CERTIFICATE OF CORRECTION

PATENT NO.   : 6,356,308 B1
DATED        : March 12, 2002
INVENTOR(S)  : Thao D. Hovanky It is certified that error appears in the above-identified patent and that said Letters Patent is hereby corrected as shown below:

Column 7,
Lines 10 and 17, delete "article" and substitute -- camera --.
Line 39, after "position of the camera;" insert -- and --.

Signed and Sealed this

Twenty-sixth Day of August, 2003

JAMES E. ROGAN
*Director of the United States Patent and Trademark Office*